(12) United States Patent
Mahler (10) Patent No.: US 10,387,799 B2
(45) Date of Patent: Aug. 20, 2019

(54) CENTRALIZED MANAGEMENT OF PREDICTIVE MODELS

(71) Applicant: Accenture Global Solutions Limited, Dublin (IE)

(72) Inventor: Paul Justin Mahler, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 802 days.

(21) Appl. No.: 14/995,852

(22) Filed: Jan. 14, 2016

(65) Prior Publication Data

US 2017/0206451 A1    Jul. 20, 2017

(51) Int. Cl.
*G06F 8/71* (2018.01)
*G06N 20/00* (2019.01)

(52) U.S. Cl.
CPC .............. *G06N 20/00* (2019.01); *G06F 8/71* (2013.01)

(58) Field of Classification Search
USPC .......................................................... 706/12
See application file for complete search history.

(56) References Cited

U.S. PATENT DOCUMENTS

| 8,214,308 | B2 * | 7/2012 | Chu | G06N 20/00 706/14 |
| 8,626,698 | B1 * | 1/2014 | Nikolaev | G06Q 10/06393 705/7.17 |
| 9,764,162 | B1 * | 9/2017 | Willcut | G16H 50/30 |
| 10,057,283 | B2 * | 8/2018 | Mahler | H04L 63/1425 |
| 2016/0241578 | A1 * | 8/2016 | Mahler | H04L 63/1425 |
| 2017/0061659 | A1 * | 3/2017 | Puri | G06T 11/206 |
| 2017/0206451 | A1 * | 7/2017 | Mahler | G06N 20/00 |
| 2018/0032899 | A1 * | 2/2018 | Nguyen | G06Q 30/02 |

OTHER PUBLICATIONS

IEEE Xplore Centralized model predictive control strategies for inventory management in semiconductor manufacturing supply chains Proceedings of the 2003 American Control Conference, 2003 Wenlin Wang, Daniel E. Rivera, Karl G. Kempf pp. 585-590.*

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on computer storage media, for centralized management of predictive models. One of the methods includes receiving a plurality of model versions from respective teams within the organization. Each received model version is processed to generate a respective predictive model corresponding to the model version, including identifying one or more collections of training data specified by the model version, identifying one or more training engines specified by the model version, training, by the identified one or more training engines, a predictive model using the identified one or more collections of training data, computing one or more performance metrics for the predictive model, and associating the one or more performance metrics for the predictive model with the corresponding model version in the version repository.

21 Claims, 6 Drawing Sheets

(56) References Cited

OTHER PUBLICATIONS

ScienceDirect Elsevier Annual Reviews in Control vol. 27, Issue 2, 2003, pp. 229-245 A Model Predictive Control framework for robust management of multi-product, multi-echelon demand networks M.W. Braun, D.E. Riveraa, M.E. Flores, W.M. Carlyl, K.G. Kempf.*

ScienceDirect Elsevier Accounting, Organizations and Society vol. 26, Issues 4-5, May-Jul. 2001, pp. 443-460 Predicting change in management accounting systems: national culture and industry effects John J Williams, Alfred E Seaman.*

IEEE Able: A toolkit for building multiagent autonomic systems J. P. Bigus; D. A. Schlosnagle; J. R. Pilgrim; W. N. Mills III; Y. Diao Published in: IBM Systems Journal ( vol. 41 , Issue: 3 , 2002) pp. 350-371.*

ScienceDirect Efsevier Long Range Planning vol. 43, Issues 2-3, Apr.-Jun. 2010, pp. 172-194 Business Models, Business Strategy and Innovation.*

IEEE Evaluating Complexity, Code Churn, and Developer Activity Metrics as Indicators of Software Vulnerabilities Yonghee Shin; Andrew Meneely; Laurie Williams; Jason A. Osborne Published in: IEEE Transactions on Software Engineering ( vol. 37 , Issue: 6 , Nov.-Dec. 2011) pp. 772-787.*

* cited by examiner

CENTRALIZED MANAGEMENT OF PREDICTIVE MODELS

BACKGROUND

This specification relates to machine learning systems.

Machine learning refers to techniques for using computing systems to train predictive models that use past training examples to predict the outcome of future events that are similarly situated as the training examples. For example, machine learning can be used to train a predictive model, or for brevity, model, that predicts the market value of a house given particular attributes of the house, e.g., square footage, ZIP code, etc. The attributes are referred to as features of the model. A collection of features associated with a single data point used to train the model is referred to as a training example.

Many large enterprises and government institutions utilize machine learning to generate predictions of many different types of phenomena, e.g., oil demand for a particular region, the incidence rate of the flu virus in January, and the likelihood that a prospective borrower is likely to default on a mortgage.

Generating predictive models can be expensive and time consuming. For a particular engineering team within an enterprise to generate a predictive model, the team must design the model and then acquire training data for training the model. Acquiring training data is often expensive because acquiring good examples and labeling the examples is time-consuming and tedious.

The efforts of multiple teams within an organization are often duplicated in designing and generating models. For example, multiple different teams within an organization may require the same type of model, and the multiple teams may each develop their own approach and expend their own effort acquiring and labeling training examples. While this may produce some models that are better than others, the under-performing models are simply subpar models that incurred duplicated effort. In other words, there is no way for these teams to collaborate or for better performing teams to share their work with lesser performing teams.

In addition, teams generally lack the ability to manage the model generation process from one iteration to the next in a disciplined way. Rather, the models are changed and retrained in an ad hoc manner. Retraining is often computationally expensive. Thus, undisciplined retraining of models further needlessly expends system resources.

Furthermore, when to retrain a model is inconsistent from one team to the next. For example, important data that changes the outcome of a housing price model, e.g., the onset of a recession, may cause only some teams to retrain their models when in reality, it would be best for the organization if all teams retrained their models in the face of such changes.

These widespread problems result in an environment in which it is difficult or impossible for management of an organization to determine which models are used by which teams, which teams design better models, and how to help teams that do not design and maintain good models.

SUMMARY

This specification describes a model maintenance system that provides for centralized management of predictive models generated by teams within an organization.

Particular embodiments of the subject matter described in this specification can be implemented so as to realize one or more of the following advantages. Multiple teams within an organization and share and build on each other's work. This leads to decreased work duplication within the organization. Management within an organization can easily obtain data about which teams generate the best models, and underperforming teams can be encouraged to build off the work of better performing teams. A system can support automatic and consistent retraining of models that use a data collection that becomes obsolete.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an organization can use a centralized model management system to maintain machine learning models developed by teams within the organization.

Figure 1:
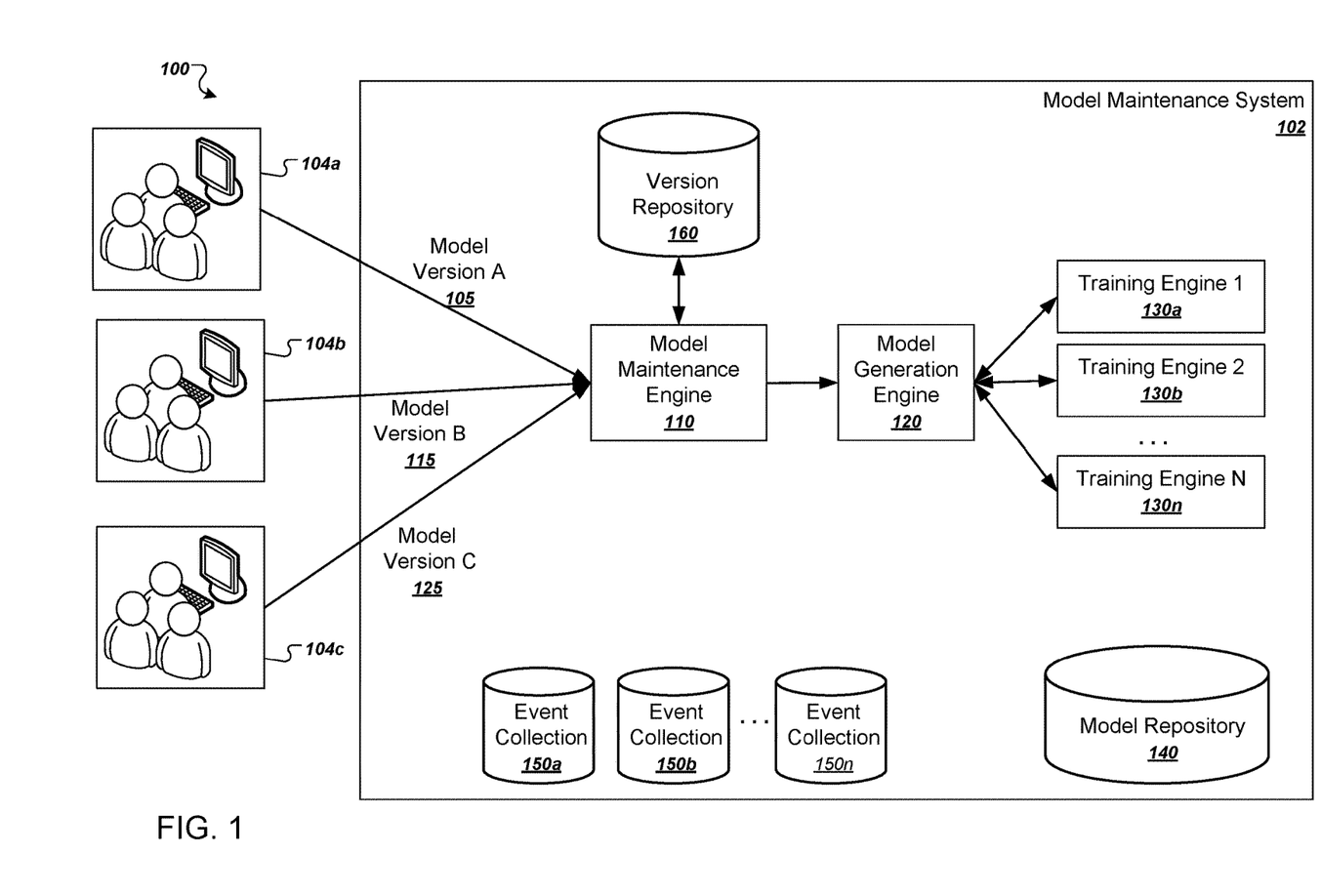
FIG. 1 is a diagram that illustrates an example system.

FIG. 1 is a diagram that illustrates an example system 100. The system includes multiple teams 104a-c of an organization in communication with a model maintenance system 102. The components of the system 100 can be implemented as computer programs installed on one or more computers in one or more locations that are coupled to each through a network, which can be any appropriate communications network. The system 100 is an example of a system in which multiple teams 104a-c of an organization can use a centralized model maintenance system 102 to maintain predictive models.

Each team 104a-c represents one or more team members associated with a particular department within an organization. Typically, each team works together to build predictive models to achieve a particular objective for the organization. Often, the individual teams do not collaborate when building models for their particular objectives.

To generate a predictive model, each team submits a collection of data that will be referred to as a model version. For example, team 104a submits model version A 105, team 104b submits model version B 115, and team 104c submits model version C 125 to the model maintenance system.

Each model version specifies a plurality of resources in the model maintenance system for building a predictive model. In particular, the model version specifies at least one or more event collections 150a-n to be used as training data for building the model and one or more training engines 130a-n to be used for building the model. Each of the training engines 130a-n is configured to generate a model using a different machine learning technique, e.g., decision trees, linear or logistic regression, neural networks, support vector machines, clustering, or dimensionality reduction, to name just a few examples.

The model versions can be specified by any appropriate data definition language, e.g., an XML, file, or structured data format, e.g. a spreadsheet file or a comma-separated value file.

A model maintenance engine 110 receives the model versions 105, 115, and 125 and stores the versions in a version repository 160. The model maintenance engine 110 uses the version repository 160 to maintain a history of model versions in use by the organization. For example, a team can check out a model version, make changes to the model version, and check the model version back into the version repository 160 using the model maintenance engine 110. Thus, the received model versions 105, 115, and 125 need not be initial models specified by the individual teams. Rather, one or more of the received model versions 105, 115, and 125 can be updates to existing models stored in the version repository.

The model maintenance system 102 can also associate additional data with each model version stored in the version repository. For example, after a model is built using the supplied model version, the system 102 can compute performance metrics for the generated model and associate the performance metrics with the model version in the version repository 160. Thus, the version repository provides a centralized view into the definition of and performance characteristics of all models used by teams within the organization.

After storing a received model version in the version repository 160, the model maintenance engine 110 can provide a model version to a model generation engine 120 to start the process of generating the model. For example, after the team 104a checks in their model version, the team 104a can provide user input specifying that the system should proceed to build the specified model.

The model generation engine 120 receives a model version and uses one or more event collections 150a-n as training data and one or more of the training engines 130a-n to build a model. The model generation engine 120 then stores the generated model in a model repository 140. After the model is generated, each team can then use the generated model to make predictions, e.g., using operational data received by the organization.

Figure 2:
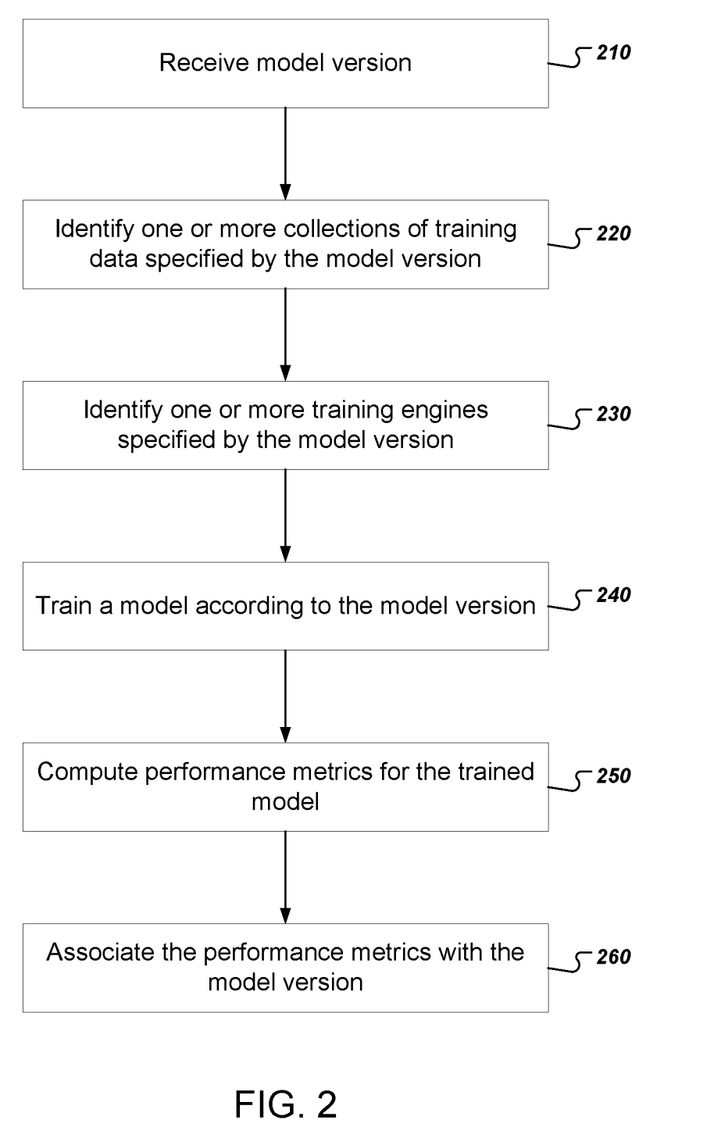
FIG. 2 is a flow chart of an example process for training and maintaining predictive models.

FIG. 2 is a flow chart of an example process for training and maintaining predictive models. The process can be implemented by one or more computer programs installed on one or more computers. The process will be described as being performed by a system of one or more computers, e.g. the model maintenance system 102 of FIG. 1.

The system receives a model version (210). As described above, the model version is a collection of data that specifies how the model should be trained. Generally, the model version specifies training data and training engines that are centrally maintained by the system, rather than specifying raw training data itself. Thus, the model version is generally relatively small compared to the data used to train the model.

The model version has a version number that uniquely identifiers the received model version. In some implementations, the version number identifies a team within the organization that is responsible for the model being built.

The system identifies one or more collections of training data specified by the model version (220). For example, the model version can specify one or more collections of training data that should be used. For each specified collection of training data, the model version can specify which features should be used and also optionally a label for each training example. For example, if the model version specifies a model that predicts housing prices, the model version can specify input features to use such as square footage, ZIP code, and a number of bedrooms, and the model version can specify output features such as market value. The model version can also specify the labels for one or more training examples in the collections of training data. For example, if the model is being used to predict whether a mortgage application will be approved, the model version can specify which of the training examples should be labeled as approved.

The system identifies one or more training engines specified by the model version (230). The model version can also specify one or more training engines that will be used to generate the model. The model version can also specify a work flow for multiple training engines, e.g., by specifying that the output of one training engine should be used as input for a subsequent training engine.

The system trains the model according to the model version (240). The system uses the specified training data and the specified training engines to generate a model. The system can store the model in a model repository for use by the responsible team.

In some cases, it is possible for a model version to specify a model that is equivalent to one that was previously specified by a different team and generated accordingly. Thus, before training the model, the system can check a version repository to determine whether any models have already been generated according to the received model version. If so, the system can bypass training the new model. The system can also generate a notification indicating to the responsible team that the proposed model already exists. This can further encourage the teams to work together to build on each other's work.

After training the model according to the model version, the responsible team can begin using the model to make predictions. For example, the team can use to model to make predictions on operational data received by the organization.

The system computes one or more performance metrics for the trained model (250). After the model has been generated, the system can compute performance metrics for the model. In general, the performance metrics include a measure of predictive accuracy for the model. In some implementations, the performance metrics measure precision and recall for the model and evaluate the model based on the measures of precision and recall for the model. The performance metrics can also include measure of calculation cost and error cost for the trained model.

The system can compute the performance metrics on real-world operational data received by the system. In other words, the system can determine a measure of how well the model performed on real-world data.

In some implementations, the model version specifies a collection of evaluation data for computing performance metrics for the model. The evaluation data can be "held out" data, which is training data that is used to evaluate the model but which was not used to generate the model.

The system associates the performance metrics with the model version (260). The system can update the model version in the version repository with one or more of the performance metrics, which can give a centralized view into how well a model generated from that model version performed.

The centralized nature of the model management system provides for many capabilities that organizations do not have. In particular, the ability to centrally manage model versions provides the ability for different teams to share one another's work and for teams to build off the work of others.

Figure 3:
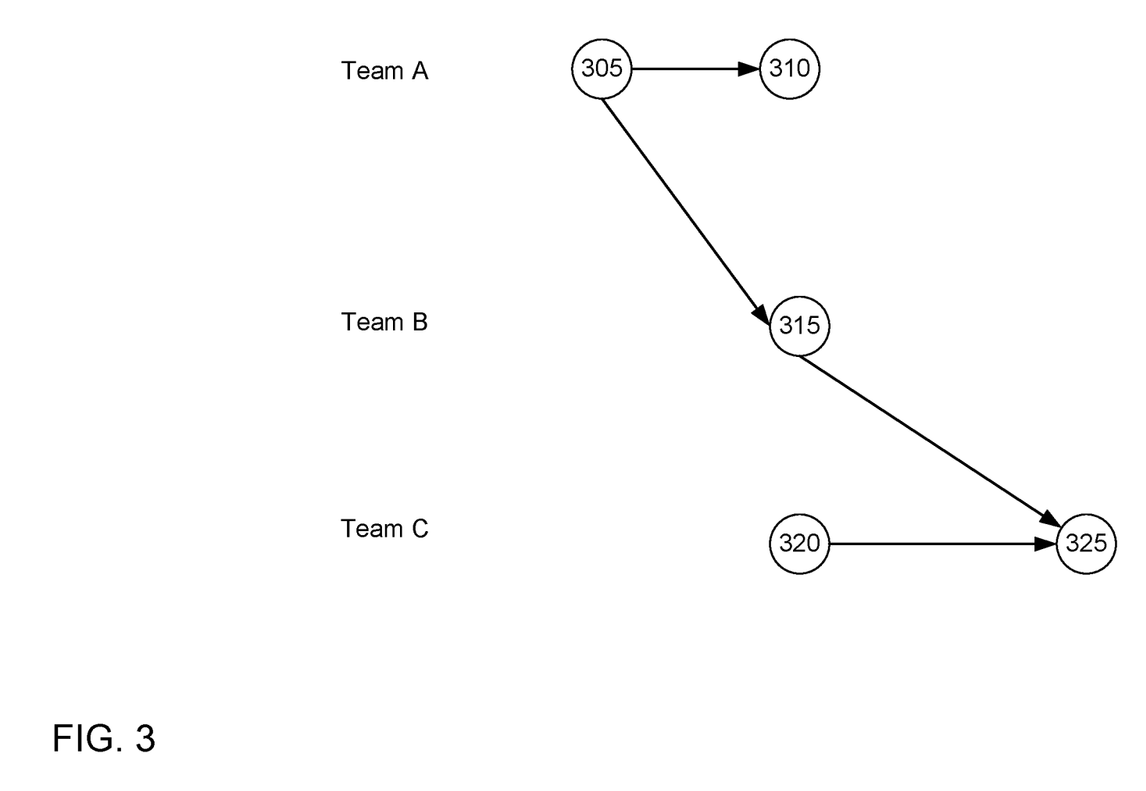
FIG. 3 illustrates a revision graph of model versions.

FIG. 3 illustrates a revision graph of model versions. Each node in the revision graph represents a particular model version, and a link between nodes represents a modification of one model version to another model version.

A model management system can maintain the model versions in a version repository. Teams can change the model versions by checking out a current working model version, modify the model version, and check in the modified model version. Doing so results in a new node in the revision graph of model versions.

For example, team A first creates a model version 305. Team A subsequently modifies model version 305 to create model version 310. For example, Team A can modify model version 305 to add additional collections of training data to be used when training a model, resulting in model version 310.

If team B begins working on a same or a similar problem, team B need not start from scratch. Rather, team B can borrow from the work of team A by forking the model version 305 into the model version 315. Team B can thus save significant effort and reduce duplicated efforts by borrowing from the models already developed by team A.

Furthermore, teams can add features from multiple models with a merged model revision. For example, if team C starts with a model version 320, team C can generated a merged model revision 325 by combining elements from both model version 315 and model version 320. The merged model version may combine advantageous elements of both of the previous model versions 315 and 320 developed by teams B and C.

In this way, the centralized model management system allows teams within the organization to build off of each other, resulting in a rapid ramp up of predictive modeling for teams within the organization.

Figure 4:
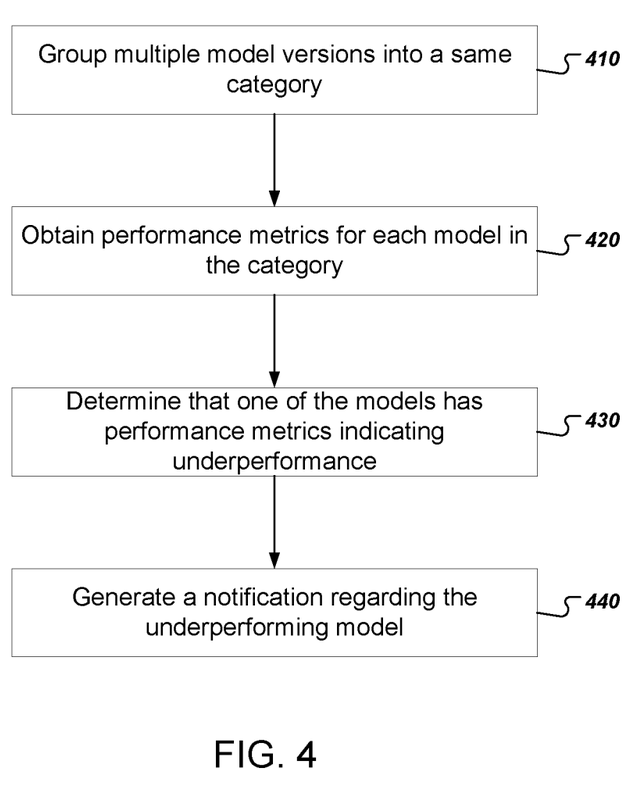
FIG. 4 is a flow chart of an example process for generating a notification for an under performing model.
Figure 5:
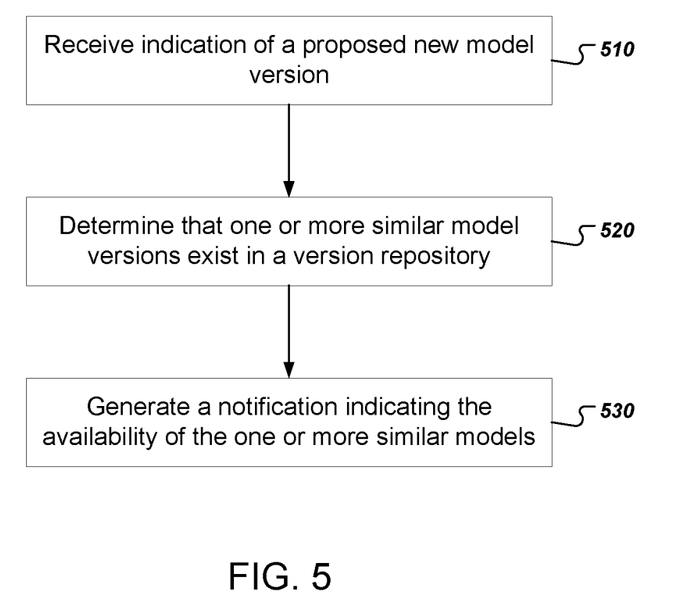
FIG. 5 is a flow chart of an example process for generating a notification of similar available models.
Figure 6:
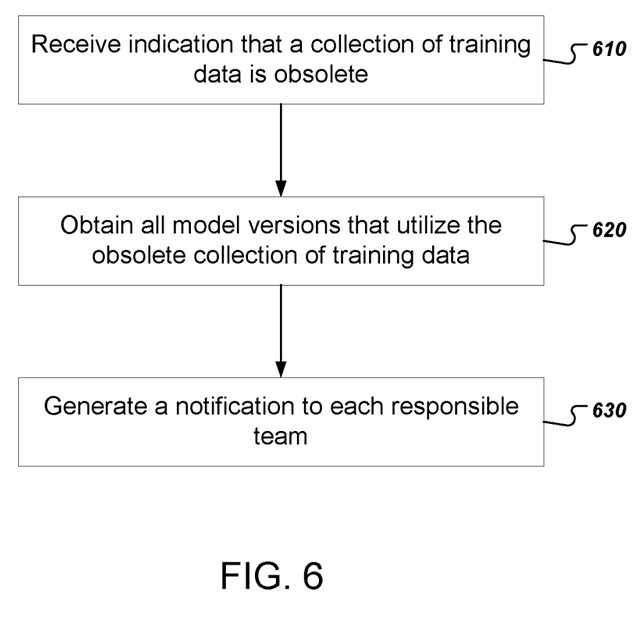
FIG. 6 is a flow chart of an example process for retraining multiple models in response to a change in training data.

The centralized nature of the model management system also allows for centralized decision-making and notifications regarding models that are being built by teams within the organization. FIGS. 4-6 are flow charts illustrating example capabilities of the model management system.

FIG. 4 is a flow chart of an example process for generating a notification for an under performing model. The process will be described as being performed by a system of one or more computers, e.g. the model maintenance system 102 of FIG. 1.

The system groups multiple model versions into a same category (410). For example, multiple teams within an organization may develop model versions that have overlapping training data and that seek to produce a same prediction. The system can thus determine that the models should be grouped into a same category. Alternatively, the system can group all model versions in the system into a same category.

The system obtains performance metrics for each model in the category (420). As described above, after each model is trained, the system can generate performance metrics from either operational data received by the system or held-out data use to evaluate the trained model. The system can then associate the performance metrics with each model version.

The system determines that one of the models has performance metrics that indicate underperformance relative to other models in the same category (430). For example, the system can determine that a particular model has performance metrics that fall within a particular percentile range when compared with other models in the category, e.g., bottom 10th percentile, bottom 30th percentile, or bottom 50th percentile.

The system generates a notification regarding the underperforming model (440). For the team that generated the underperforming model, the system can automatically generate a notification for the team that indicates that the model is underperforming and which points out other models in the same category. The notification can be provided using any appropriate format, e.g., by an interactive message in a user interface or by sending a message to a team lead of the team that generated the underperforming model version.

The team will then be encouraged to borrow from the work of the other teams in order to improve the performance of their model. The team can thus benefit by sharing work developed by other teams, thus improving the modeling capability of the organization as a whole.

FIG. 5 is a flow chart of an example process for generating a notification of similar available models. The process will be described as being performed by a system of one or more computers, e.g. the model maintenance system 102 of FIG. 1.

The system receives an indication of a proposed new model version (510). As described above, the model version specifies at least one or more centrally maintained collections of training data, and one or more training engines for generating the model.

The system determines that one or more similar model versions exist in a version repository (520). The system can determine that the proposed model overlaps with models developed by other teams. For example, the system can compute a measure of overlap of the training data for each of the model versions. If the measure of overlap satisfies a threshold, the system can designate the existing model versions as similar model versions. The system can also compute measures of overlap for the training engines to be used as well as the features that are to be used for the proposed model version.

The system generates a notification that indicates the availability of the one or more similar model versions in the model repository (530). The notification can be provided using any appropriate format, e.g., by an interactive message in a user interface or by sending a message to a team lead of the team that submitted the proposed model version. The team will thus be encouraged to borrow from the work of other teams rather than by starting a new model from scratch.

FIG. 6 is a flow chart of an example process for retraining multiple models in response to a change in training data. The process will be described as being performed by a system of one or more computers, e.g. the model maintenance system 102 of FIG. 1.

The system receives an indication that a collection of training data is obsolete (610). A collection of training data can become obsolete for a number of reasons. For example, if there are large scale changes in the economy, the current training data for predicting housing prices may become obsolete. In that instance, models that used the obsolete training data should be retrained on newer training data.

The system can determine that a collection of training data is obsolete in a number of ways. In some implementations, a system administrator can mark a collection of training data as obsolete. The system can also continually compute differences between selected training examples and actual operational data received by the system in order to detect a drift in the operational data compared to the collection of training data.

The system obtains, from a version repository, all model versions that utilize the obsolete collection of training data (620). Because the model versions are centrally maintained in the version repository, the system can query the version repository for all current model versions that have been trained on the obsolete training data.

The system generates a notification to each responsible team that the respective models need to be retrained (630). After identifying all of the affected model versions, the system generates notifications to the respective teams that are responsible for the affected models. The system may also disable the corresponding trained models so that the teams are not utilizing models that were trained on obsolete data.

In response, the teams can each submit new model versions that do not use the obsolete collection of training data. Alternatively or in addition, the system can automatically retrain some models by automatically generating a new model version that simply drops the obsolete collection of training data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving a plurality of model versions from respective teams within the organization, wherein each model version is a collection of data that specifies one or more maintained collections of training data and one or more training engines for generating a predictive model from the one or more maintained collections of training data;
storing each of the plurality of model versions in a version repository; and
processing each received model version to generate a respective predictive model corresponding to the model version, including:
identifying one or more collections of training data specified by the model version,
identifying one or more training engines specified by the model version,
training, by the identified one or more training engines, a predictive model using the identified one or more collections of training data,
computing one or more performance metrics for the predictive model, and
associating the one or more performance metrics for the predictive model with the corresponding model version in the version repository.

Embodiment 2 is the method of embodiment 1, wherein at least one of the received model versions is a forked model version that reuses one or more features from another model in the version repository.

Embodiment 3 is the method of any one of embodiments 1-2, wherein at least one of the received model versions is a merged model version that combines features of one or more other models in the version repository.

Embodiment 4 is the method of any one of embodiments 1-3, further comprising:
obtaining performance metrics associated with each of the model versions in the version repository;
determining that one of the model versions has a performance metric indicating underperformance relative to the other model versions; and
generating a notification to a team responsible for the underperforming model version.

Embodiment 5 is the method of embodiment 4, further comprising grouping each of the model versions into a same category.

Embodiment 6 is the method of any one of embodiments 1-5, further comprising:
receiving an indication of a proposed new model version;
determining that one or more similar model versions already exist in the version repository; and
generating a notification to a team responsible for the proposed new model version, wherein the notification indicates the availability of the one or more similar model versions that already exist in the version repository.

Embodiment 7 is the method of any one of embodiments 1-6, further comprising:
receiving an indication that a particular collection of training data is obsolete;
obtaining, from the version repository, identifiers of all model versions that utilize the obsolete collection of training data; and
generating a notification to each respective team responsible for a model version that utilizes the obsolete collection of training data.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for centralized management of predictive models within an organization, the system comprising:
one or more computers and one or more storage devices storing instructions that are operable, when executed by the one or more computers, to cause the one or more computers to perform operations comprising:
receiving, by a model maintenance system, a plurality of model versions from respective teams within the organization, wherein each model version is a collection of data that specifies one or more maintained collections of training data and one or more training engines for generating a predictive model from the one or more maintained collections of training data, wherein the model maintenance system is configured to generate predictive models by providing each of the one or more maintained collections of training data as input to each of the one or more training engines;
storing, by the model maintenance system, each of the plurality of model versions in a version repository; and
processing, by the model maintenance system, each received model version to generate a respective predictive model corresponding to the model version, including:
identifying, by the model maintenance system, a first collection of training data specified by a first model version and a second collection of training data specified by a second model version,
identifying, by the model maintenance system, a first training engine specified by the first model version and a second training engine specified by the second model version,
determining, by the model maintenance system, that a first predictive model based on the first collection of training data and the first training engine is not stored in the model maintenance system;
based on determining that the first predictive model based on the first collection of training data and the first training engine is not stored in the model maintenance system, training, by the first training engine of the model maintenance system, the first predictive model using the first collection of training data,
determining, by the model maintenance system, that a second predictive model based on the second collection of training data and the second training engine is stored in the model maintenance system,
based on determining that the second predictive model based on the second collection of training data and the second training engine is stored in the model maintenance system, bypassing, by the model maintenance system, training the second predictive model,
computing, by the model maintenance system, one or more performance metrics for the first predictive,
associating, by the model maintenance system, the one or more performance metrics for the first predictive model with the corresponding model version in the version repository.

2. The system of claim 1, wherein at least one of the received model versions is a forked model version that reuses one or more features from another model in the version repository.

3. The system of claim 1, wherein at least one of the received model versions is a merged model version that combines features of one or more other models in the version repository.

4. The system of claim 1, wherein the operations further comprise:
obtaining performance metrics associated with each of the model versions in the version repository;
determining that one of the model versions has a performance metric indicating underperformance relative to the other model versions; and
generating a notification to a team responsible for the underperforming model version.

5. The system of claim 4, wherein the operations further comprise grouping each of the model versions into a same category.

6. The system of claim 1, wherein the operations further comprise:
receiving an indication of a proposed new model version;
determining that one or more similar model versions already exist in the version repository; and
generating a notification to a team responsible for the proposed new model version, wherein the notification indicates the availability of the one or more similar model versions that already exist in the version repository.

7. The system of claim 1, wherein the operations further comprise:
receiving an indication that a particular collection of training data is obsolete;
obtaining, from the version repository, identifiers of all model versions that utilize the obsolete collection of training data; and
generating a notification to each respective team responsible for a model version that utilizes the obsolete collection of training data.

8. A computer-implemented method comprising:
receiving, by a model maintenance system, a plurality of model versions from respective teams within the organization, wherein each model version is a collection of data that specifies one or more maintained collections of training data and one or more training engines for generating a predictive model from the one or more maintained collections of training data, wherein the model maintenance system is configured to generate predictive models by providing each of the one or more maintained collections of training data as input to each of the one or more training engines;
storing, by the model maintenance system, each of the plurality of model versions in a version repository; and
processing, by the model maintenance system, each received model version to generate a respective predictive model corresponding to the model version, including:
identifying, by the model maintenance system, a first collection of training data specified by a first model version and a second collection of training data specified by a second model version, identifying, by the model maintenance system, a first training engine specified by the first model version and a second training engine specified by the second model version, determining, by the model maintenance system, that a first predictive model based on the first collection of training data and the first training engine is not stored in the model maintenance system;

based on determining that the first predictive model based on the first collection of training data and the first training engine is not stored in the model maintenance system, training, by the first training engine of the model maintenance system, the first predictive model using the first collection of training data, determining, by the model maintenance system, that a second predictive model based on the second collection of training data and the second training engine is stored in the model maintenance system, based on determining that the second predictive model based on the second collection of training data and the second training engine is stored in the model maintenance system, bypassing, by the model maintenance system, training the second predictive model, computing, by the model maintenance system, one or more performance metrics for the first predictive, associating, by the model maintenance system, the one or more performance metrics for the first predictive model with the corresponding model version in the version repository.

9. The method of claim 8, wherein at least one of the received model versions is a forked model version that reuses one or more features from another model in the version repository.

10. The method of claim 8, wherein at least one of the received model versions is a merged model version that combines features of one or more other models in the version repository.

11. The method of claim 8, further comprising:
obtaining performance metrics associated with each of the model versions in the version repository;
determining that one of the model versions has a performance metric indicating underperformance relative to the other model versions; and
generating a notification to a team responsible for the underperforming model version.

12. The method of claim 11, further comprising grouping each of the model versions into a same category.

13. The method of claim 8, further comprising:
receiving an indication of a proposed new model version;
determining that one or more similar model versions already exist in the version repository; and
generating a notification to a team responsible for the proposed new model version, wherein the notification indicates the availability of the one or more similar model versions that already exist in the version repository.

14. The method of claim 8, further comprising:
receiving an indication that a particular collection of training data is obsolete;
obtaining, from the version repository, identifiers of all model versions that utilize the obsolete collection of training data; and
generating a notification to each respective team responsible for a model version that utilizes the obsolete collection of training data.

15. A computer program product, encoded on one or more non-transitory computer storage media, comprising instructions that when executed by one or more computers cause the one or more computers to perform operations comprising:

receiving, by a model maintenance system, a plurality of model versions from respective teams within the organization, wherein each model version is a collection of data that specifies one or more maintained collections of training data and one or more training engines for generating a predictive model from the one or more maintained collections of training data, wherein the model maintenance system is configured to generate predictive models by providing each of the one or more maintained collections of training data as input to each of the one or more training engines;

storing, by the model maintenance system, each of the plurality of model versions in a version repository; and processing, by the model maintenance system, each received model version to generate a respective predictive model corresponding to the model version, including:

identifying, by the model maintenance system, a first collection of training data specified by a first model version and a second collection of training data specified by a second model version, identifying, by the model maintenance system, a first training engine specified by the first model version and a second training engine specified by the second model version, determining, by the model maintenance system, that a first predictive model based on the first collection of training data and the first training engine is not stored in the model maintenance system;

based on determining that the first predictive model based on the first collection of training data and the first training engine is not stored in the model maintenance system, training, by the more first training engine of the model maintenance system, the first predictive model using the first collection of training data, determining, by the model maintenance system, that a second predictive model based on the second collection of training data and the second training engine is stored in the model maintenance system, based on determining that the second predictive model based on the second collection of training data and the second training engine is stored in the model maintenance system, bypassing, by the model maintenance system, training the second predictive model, computing, by the model maintenance system, one or more performance metrics for the first predictive, associating, by the model maintenance system, the one or more performance metrics for the first predictive model with the corresponding model version in the version repository.

16. The computer program product of claim 15, wherein at least one of the received model versions is a forked model version that reuses one or more features from another model in the version repository.

17. The computer program product of claim 15, wherein at least one of the received model versions is a merged model version that combines features of one or more other models in the version repository.

18. The computer program product of claim 15, wherein the operations further comprise:

obtaining performance metrics associated with each of the model versions in the version repository;

determining that one of the model versions has a performance metric indicating underperformance relative to the other model versions; and generating a notification to a team responsible for the underperforming model version.

19. The computer program product of claim 18, wherein the operations further comprise grouping each of the model versions into a same category.

20. The computer program product of claim 15, wherein the operations further comprise:

receiving an indication of a proposed new model version;

determining that one or more similar model versions already exist in the version repository; and generating a notification to a team responsible for the proposed new model version, wherein the notification indicates the availability of the one or more similar model versions that already exist in the version repository.

21. The computer program product of claim 15, wherein the operations further comprise:

receiving an indication that a particular collection of training data is obsolete;

obtaining, from the version repository, identifiers of all model versions that utilize the obsolete collection of training data; and generating a notification to each respective team responsible for a model version that utilizes the obsolete collection of training data.

* * * * *

UNITED STATES PATENT AND TRADEMARK OFFICE
CERTIFICATE OF CORRECTION

PATENT NO. : 10,387,799 B2
APPLICATION NO. : 14/995852
DATED : August 20, 2019
INVENTOR(S) : Paul Justin Mahler Page 1 of 1

It is certified that error appears in the above-identified patent and that said Letters Patent is hereby corrected as shown below:

In the Claims

In Claim 15, Column 14, Line 38, after "the" delete "more".

Signed and Sealed this
Twenty-second Day of October, 2019

Andrei Iancu
*Director of the United States Patent and Trademark Office*